F. R. WARNER.
Advertising Lamps.
No. 141,971. Patented August 19, 1873.
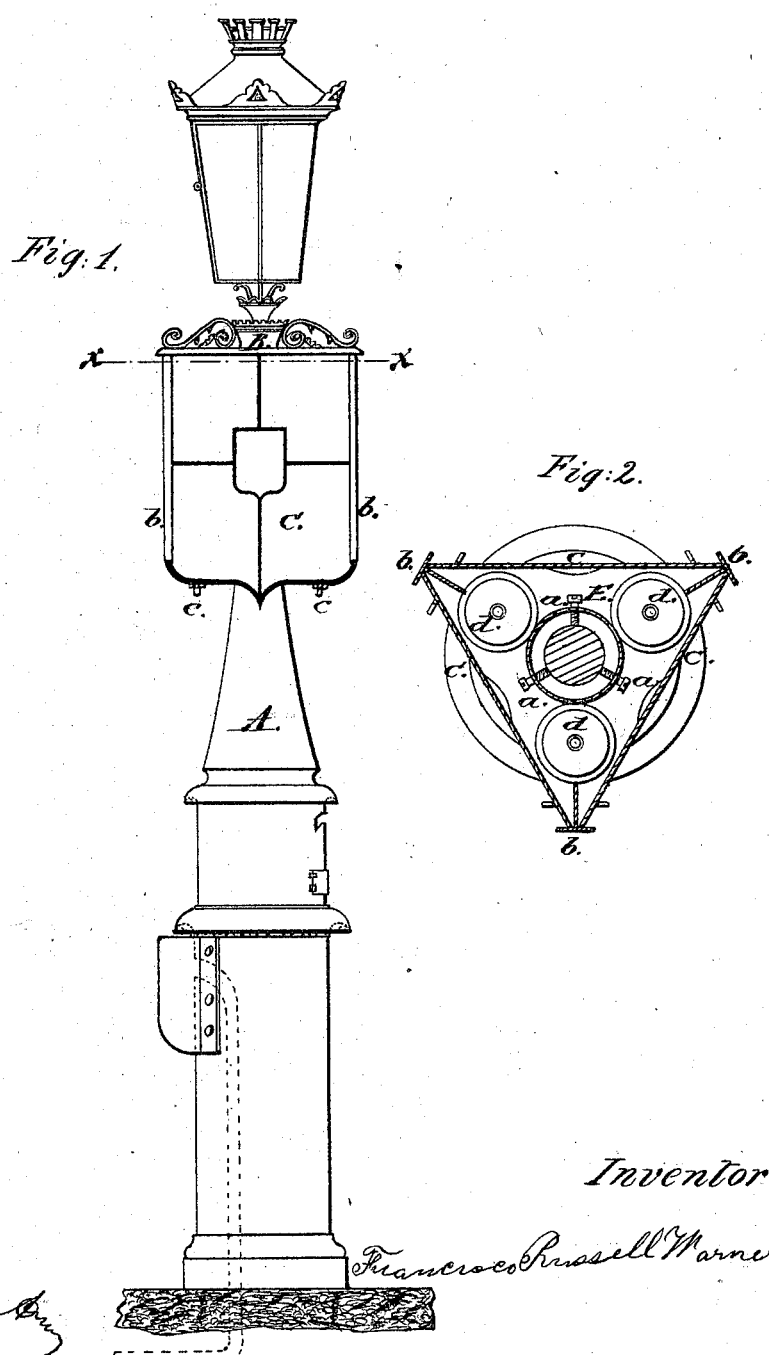

UNITED STATES PATENT OFFICE.

FRANCISCO R. WARNER, OF PARIS, FRANCE.

IMPROVEMENT IN ADVERTISING-LAMPS.

Specification forming part of Letters Patent No. 141,971, dated August 19, 1873; application filed November 14, 1872.

*To all whom it may concern:*

Be it known that I, FRANCISCO RUSSELL WARNER, a casually resident of Paris, France, have invented an Improved Lamp-Post Advertising Medium; and I do hereby declare the following to be a full, clear, and exact description thereof, reference being had to the accompanying drawings forming a part thereof, in which—

Figure 1 is a front elevation of a lamp-post having the advertising medium attached. Fig. 2 is a transverse or horizontal section of the same in line X X, Fig. 1.

This invention consists of a metallic frame of peculiar form adjustably attached to a lamp-post and provided with removable glass plates, upon which the advertisements are displayed, lamps being provided for the illumination of the advertisements at night, all as will be hereinafter explained.

In the drawing, A represents a lamp-post, which may be of ordinary or other suitable form and material. B is a skeleton metallic frame, of triangular form, in cross-section, provided with a central tube, E, of sufficient interior diameter to be readily and easily slipped over the upper reduced portion of the post A. Near the top and bottom of this tube it is provided with set-screws $a$, which serve to secure the frame to the post. Forward upon, or suitably attached to, the frame B at the junction of the angles thereof, are plates or flanges $b$, which, in conjunction with buttons $c$ attached to frame B on the under side thereof, serve to hold in place plates of glass C, upon which advertisements are displayed. These advertisements may be painted directly upon the glass, or ordinary printed advertisements may be affixed to the glass by pasting, or in any other suitable manner. In the angles of the skeleton frame B are placed small lamps $d$ for the illumination of the advertisements at night. In lieu of these lamps may be used jets of gas. The glass plates C are so adjusted that each can be separately removed and replaced at will for the convenience of removing and replacing advertisements.

The frame B being closed on all sides, as also at top and bottom, the advertisements and lights are protected against the weather.

The central tube E, with which the advertising-frame is provided, admits of the adjustment of the frame, both as to height and angle, and when adjusted the set-screws serve to firmly hold it in place.

Having thus described my invention, what I claim as new, and desire to secure by Letters Patent, is—

The lamp-post advertising medium herein described, consisting of the skeleton frame B, glass plates C, central tube E, set-screws $a$, and post A, as set forth.

FRANCISCO RUSSELL WARNER.

Witnesses:
EMILE DUHAN,
ADOLPHE GUION.